United States Patent
Fleming et al.

(10) Patent No.: US 10,331,093 B2
(45) Date of Patent: Jun. 25, 2019

(54) SYSTEMS AND METHODS FOR OPTIMIZING FACILITY LIMITED PRODUCTION AND INJECTION IN AN INTEGRATED RESERVOIR AND GATHERING NETWORK

(71) Applicant: LANDMARK GRAPHICS CORPORATION, Houston, TX (US)

(72) Inventors: Graham Christopher Fleming, Houston, TX (US); Qin Lu, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 548 days.

(21) Appl. No.: 14/408,210

(22) PCT Filed: May 28, 2013

(86) PCT No.: PCT/US2013/042825
§ 371 (c)(1),
(2) Date: Dec. 15, 2014

(87) PCT Pub. No.: WO2013/188088
PCT Pub. Date: Dec. 19, 2013

(65) Prior Publication Data
US 2015/0134127 A1    May 14, 2015

Related U.S. Application Data

(60) Provisional application No. 61/660,660, filed on Jun. 15, 2012.

(51) Int. Cl.
*G05D 7/06* (2006.01)
*E21B 43/00* (2006.01)
*G05B 13/04* (2006.01)

(52) U.S. Cl.
CPC ............ *G05B 13/042* (2013.01); *E21B 43/00* (2013.01); *G05D 7/0617* (2013.01)

(58) Field of Classification Search
CPC ...... G05B 13/042; E21B 43/00; G05D 7/0617
(Continued)

(56) References Cited

U.S. PATENT DOCUMENTS 7,657,494 B2 * 2/2010 Wilkinson ............. E21B 43/00
  702/13
8,078,444 B2  12/2011 Rashid et al.
(Continued)

FOREIGN PATENT DOCUMENTS

WO    2010/039566    4/2010
WO    2013/188088    12/2013

OTHER PUBLICATIONS

PCT International Preliminary Report on Patentability, dated Oct. 2, 2014, Appl No. PCT/US2013/042825, "Systems and Methods for Optimizing Facility Limited Production and Injection in an Integrated Reservoir and Gathering Network," Filed May 28, 2013, 4 pgs.

(Continued)

*Primary Examiner* — Ryan D. Coyer
(74) *Attorney, Agent, or Firm* — Tenley Krueger; Parker Justiss, P.C.

(57) ABSTRACT

Systems and methods for determining operating settings for a fluid production system that includes wells and a processing facility, the method including identifying at least one swing well and one or more non-swing wells and determining at least one target parameter equation that is a function of at least one processing facility constraint and one or more non-swing well parameters. The method further includes incorporating the target parameter equation into a fully-coupled equation set representing the production system, simulating the production system using the fully-coupled equation set to obtain one or more operating settings that meet the processing facility constraint, and presenting to a user the operating settings.

20 Claims, 5 Drawing Sheets

(58) Field of Classification Search
USPC .......................................................... 700/282
See application file for complete search history.

(56) References Cited

U.S. PATENT DOCUMENTS

| | | | | |
|---|---|---|---|---|
| 2002/0165671 | A1* | 11/2002 | Middya | E21B 43/14 702/12 |
| 2007/0271077 | A1* | 11/2007 | Kosmala | E21B 43/00 703/5 |
| 2009/0198477 | A1* | 8/2009 | Benish | E21B 43/00 703/10 |
| 2011/0011595 | A1* | 1/2011 | Huang | E21B 43/00 166/369 |
| 2012/0136641 | A1* | 5/2012 | Fung | E21B 43/00 703/10 |
| 2012/0150518 | A1* | 6/2012 | Guyaguler | E21B 41/00 703/10 |
| 2012/0303342 | A1* | 11/2012 | Hazlett | E21B 43/26 703/2 |
| 2013/0096890 | A1* | 4/2013 | Vanderheyden | G06F 17/5009 703/2 |

OTHER PUBLICATIONS

PCT International Search Report and Written Opinion, dated Oct. 16, 2013, Appl No. PCT/US2013/042825, "Systems and Methods for Optimizing Facility Limited Production and Injection in an Integrated Reservoir and Gathering Network," Filed May 28, 2013, 4 pgs.

"GCC First Examination Report", dated Apr. 13, 2016, Appl No. 24617, "Systems and Methods for Optimizing Facility Limited Production and Injection in an Integrated Reservoir and Gathering Network," filed Jun. 10, 2013, 7 pgs.

"AU Examination Report", dated Aug. 8, 2015 "Systems and Methods for Optimizing Facility Limited Production and Injection in an Integrated Reservoir and Gathering Network" Appln. No. 2013274731 filed May 28, 2013, 3 pgs.

"AU Patent Examination Report No. 3", dated Jul. 27, 2016, Appl No. 2013274731, "Systems and Methods for Optimizing Facility Limited Production and Injection in an Integrated Reservoir and Gathering Network," Filed May 28, 2013, 3 pgs.

"CA Examination Report", dated Feb. 11, 2016 "Systems and Methods for Optimizing Facility Limited Production and Injection in an Integrated Reservoir and Gathering Network" Appln. No. 2874977 filed May 28, 2013, 4 pgs.

"CA Office Action", dated Jan. 26, 2017, Appl No. 2,874,977, "Systems and Methods for Optimizing Facility Limited Production and Injection in an Integrated Reservoir and Gathering Network," Filed May 28, 2013, 4 pgs.

"Extended European Search Report", dated Feb. 10, 2016 Systems and Methods for Optimizing Facility Limited Production and Injection in an Integrated Reservoir and Gathering Network Appln. No. 13803872.4 filed May 28, 2013, 6 pgs.

"AU Patent Examination Report No. 2", dated Jul. 12, 2016, Appl No. 2013274731, "Systems and Methods for Optimizing Facility Limited Production and Injection in an Integrated Reservoir and Gathering Network," Filed May 28, 2013, 3 pgs.

"RU Office Action", dated Jan. 19, 2016, Appl No. 2014148798, "Systems and Methods for Optimizing Facility Limited Production and Injection in an Integrated Reservoir and Gathering Network," Filed May 28, 2013, 13 pgs.

B. K. Coats et al., "A Generalized Wellbore and Surface Facility Model, Fully Coupled to a Reservoir Simulator, " SPERE, Apr. 2004, pp. 132-232.

Jeffrey E. Davidson et al., "Integrated Optimization for Rate Allocation in Reservoir Simulation," SPERE, Dec. 2003, pp. 426-432.

W. Y. Fang et all., "A Generalized Well-Management Scheme for Reservoir Simulation," SPERE, May 1996, pp. 116-120.

Trick MD: "A different approach to coupling a reservoir simulator with a surface facilities model" SPE Papers. XX. XX. No. spe 40001. Mar. 15, 1998 (Mar. 15, 1998). pp. 285-290. XP002240561. * the whole document *.

* cited by examiner

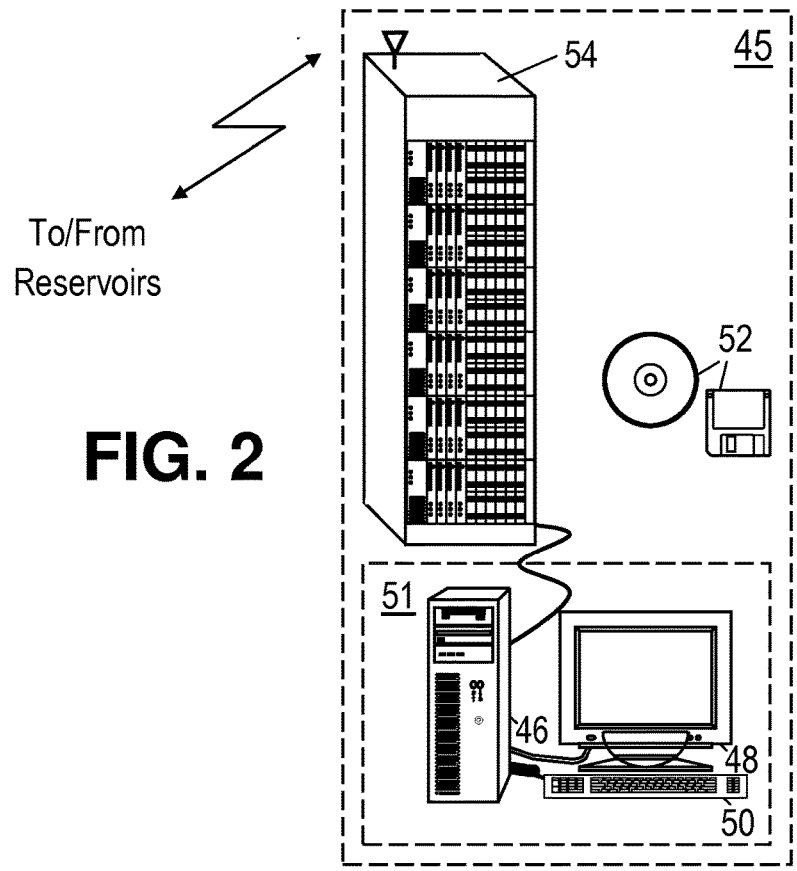
FIG. 2
FIG. 3
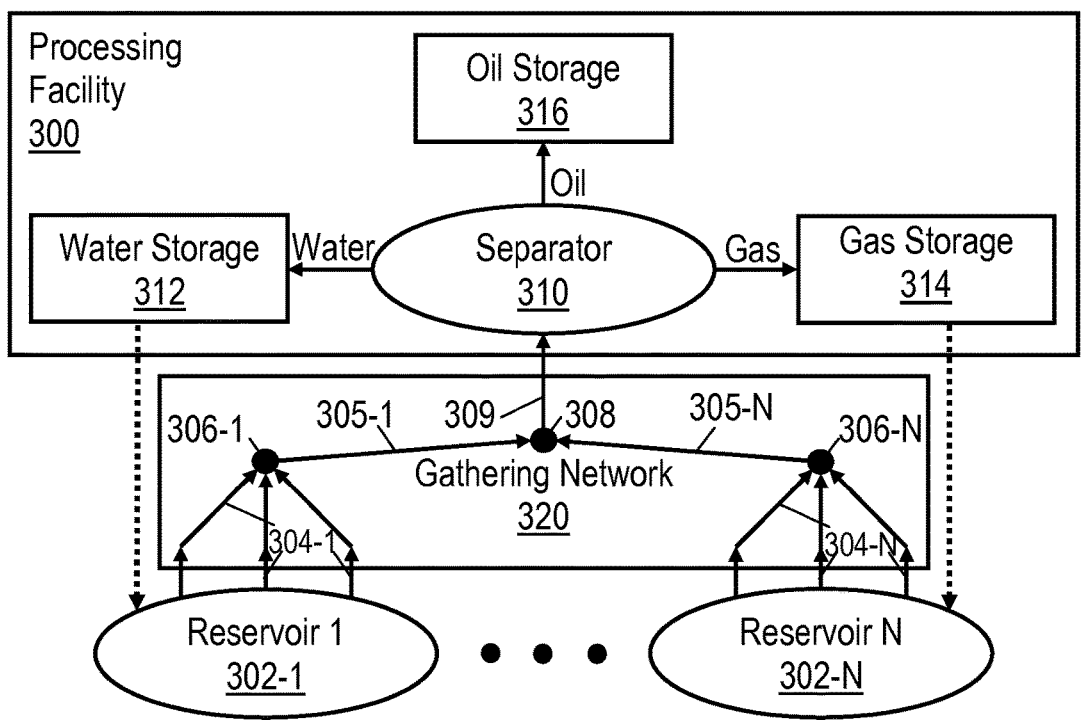

SYSTEMS AND METHODS FOR OPTIMIZING FACILITY LIMITED PRODUCTION AND INJECTION IN AN INTEGRATED RESERVOIR AND GATHERING NETWORK

CROSS-REFERENCE TO RELATED APPLICATIONS

This application claims priority to Provisional U.S. Application Ser. No. 61/660,660, titled "Method for Optimizing Production and Injection Subject to Facility Limits in an Integrated Reservoir and Surface Flow System" and filed Jun. 15, 2012 by Graham C. Fleming and Qin Lu, which is incorporated herein by reference.

BACKGROUND

Reservoir monitoring, sometimes referred to as reservoir surveillance, involves the regular collection and monitoring of measured production data from within and around the wells of a reservoir. Such data may include, but is not limited to, water saturation, water and oil cuts, fluid pressure and fluid flow rates. As the data is collected, it is archived into a historical database.

The collected production data, however, mostly reflects conditions immediately around the reservoir wells. Simulations model the overall behavior of the entire reservoir based on the collected data, both current and historical, to provide a more complete picture of the state of a reservoir. These simulations produce simulated interwell data values both near and at a distance from the wellbores. Simulated near-wellbore data is correlated against measured near-wellbore data, and the modeling parameters are adjusted as needed to reduce the error between the simulated and measured data. Once so adjusted, the simulated interwell data, both near and at a distance from the wellbore, may be relied upon to assess the overall state of the reservoir. Such data may also be relied upon to predict the future behavior of the reservoir based upon either actual or hypothetical conditions input by an operator of the simulator.

The results of such predictive simulations may be used to determine optimal settings for operating the wells within the reservoirs and thus maximize reservoir production. However, these settings are typically optimized for each well individually. For reservoirs with multiple wells feeding a common gathering network that delivers the product to a single processing facility, the well-optimized solution can result in violations of processing facility constraints. For example, for wells that are oil rate constrained, the water rate may increase over time such that the overall water rate may exceed the processing facility's maximum water limit. If this violation exceeds a pre-established tolerance, additional simulation iterations are generally performed to determine updated well-optimized operating parameters. Such additional simulations can incur significant additional operating costs, given that reservoir simulations, particularly those that perform full physics numerical simulations of large reservoirs, are computationally intensive and can take hours, even days to execute.

BRIEF DESCRIPTION OF THE DRAWINGS

A better understanding of the various disclosed embodiments can be obtained when the following detailed description is considered in conjunction with the attached drawings, in which:

FIG. 2 shows an illustrative processing system suitable for implementing the disclosed methods and system.

FIG. 3 shows an illustrative block diagram of a production field, gathering network and processing facility that can be simulated as disclosed herein.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

The paragraphs that follow describe various illustrative systems and methods for solving a fully-coupled set of equations representing a multi-reservoir production system with heterogeneous fluids coupled to a common gathering network. Illustrative production wells and associated data collection and processing system are first described, followed by a description of a multi-reservoir production field and its associated gathering network and processing facility. Simulations of the reservoirs and gathering network are described that solve the reservoir, well and gathering network system as a fully-coupled equation set. The solution includes operating points for various devices that control fluid production from, and/or injection to, the reservoirs while honoring constraints factored into the system equations (e.g., reservoir, well, gathering network and/or facility constraints). Finally, an illustrative method for incorporating the facility constraints into a production system simulation that determines operating settings is described concurrently with a data acquisition and processing system that implements the method.

Figures 1A, 1B:
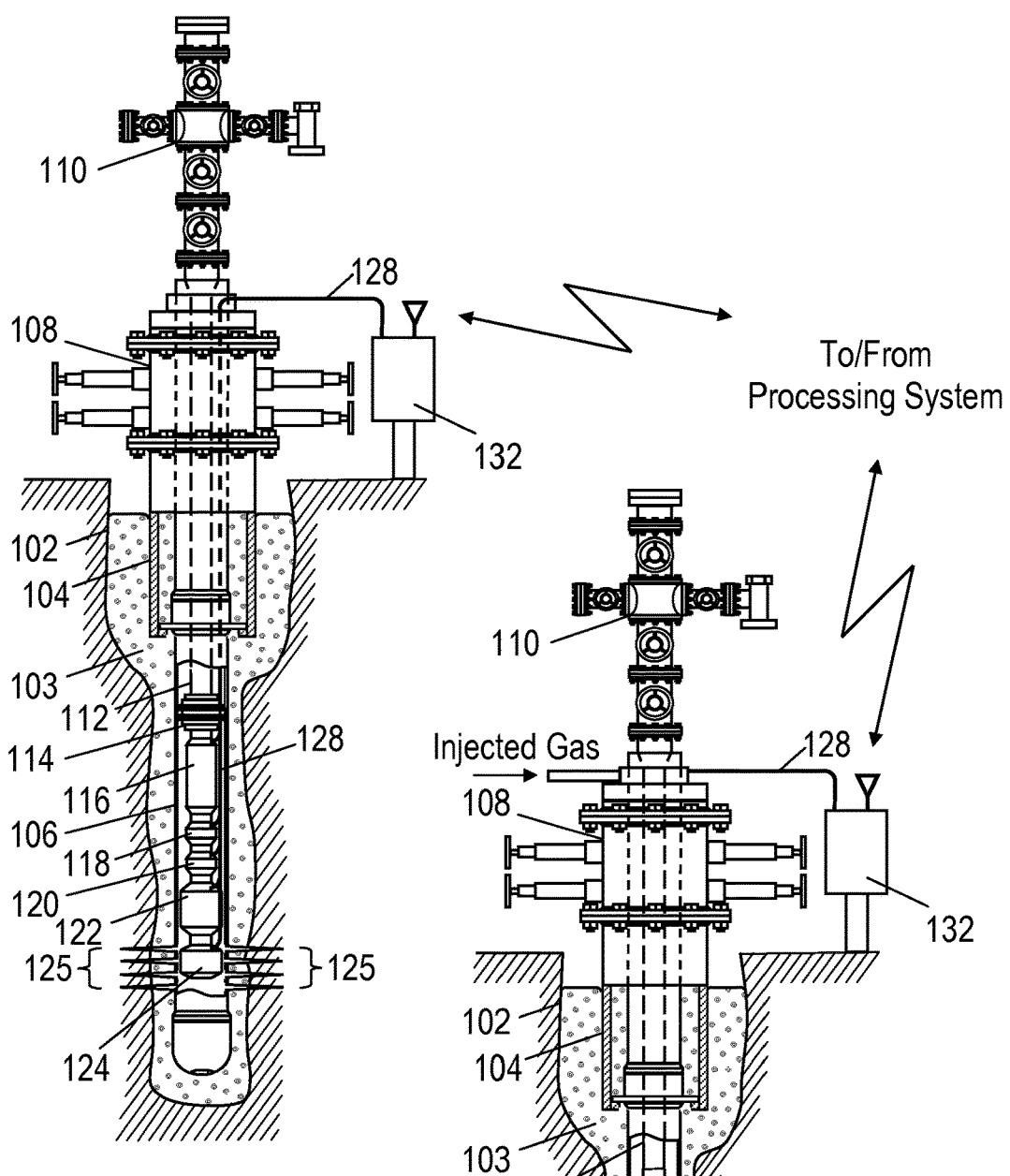
FIGS. 1A and 1B show illustrative completed wells suitable for use with the disclosed methods and system.

The systems and methods described herein operate on measured data collected from wells within a reservoir, such as those found in oil and gas production reservoirs. Such reservoirs generally include multiple producer and/or injector wells that operate to provide access to the reservoir fluids underground. Measured well data is collected regularly from each well to track changing conditions in the reservoir. FIG. 1A shows an example of a producer well with a borehole 102 that has been drilled into the earth. Such boreholes are routinely drilled to ten thousand feet or more in depth and can be steered horizontally for perhaps twice that distance. The producer well also includes a casing header 104 and casing 106, both secured into place by cement 103. Blowout preventer (BOP) 108 couples to casing header 106 and production wellhead 110, which together seal in the well head and enable fluids to be extracted from the well in a safe and controlled manner. Injector wells may include similar structures and devices.

Measured well data is periodically sampled and collected from the producer well and combined with measurements from other wells within a reservoir, enabling operators to monitor and assess the overall state of the reservoir. These measurements may be taken using a number of different downhole and surface instruments, including but not limited to, temperature and pressure sensor 118 and flow meter 120.

Additional devices also coupled in-line to production tubing 112 include downhole choke 116 (used to vary the fluid flow restriction), electric submersible pump (ESP) 122 (which draws in fluid flowing from perforations 125 outside ESP 122 and production tubing 112) ESP motor 124 (driving ESP 122), and packer 114 (isolating the production zone below the packer from the rest of the well). Additional surface measurement devices may measure, for example, the tubing head pressure and the electrical power consumption of ESP motor 124. In another illustrative producer well embodiment shown in FIG. 1B, a gas lift injector mandrel 126 is coupled in-line with production tubing 112 that controls injected gas flowing into the production tubing at the surface. Although not shown, the gas lift producer well of FIG. 1B may also include the same type of downhole and surface instruments to provide the above-described measurements.

Each of the devices along production tubing 112 couples to cable 128, which attaches to the exterior of production tubing 112 and extends to the surface through blowout preventer 108 where it couples to control panel 132. Cable 128 provides power to the devices to which it couples, and further provides signal paths (electrical, optical, etc.,) that enable control signals to be directed from the surface to the downhole devices, and for telemetry signals to be received at the surface from the downhole devices. Field personnel may control and monitor the devices locally using a user interface built into control panel 132. Alternatively, a remote processing system, such as the processing system 45 shown in FIG. 2 and described below, performs such monitoring and control. Communication between control panel 132 and the remote processing system may be via a wireless network (e.g., a cellular network), via a cabled network (e.g., a cabled connection to the Internet), or a combination of wireless and cabled networks.

For both of the producer well embodiments of FIGS. 1A and 1B, control panel 132 includes a remote terminal unit (RTU) which collects the data from the downhole measurement devices and forwards it to, for example, a supervisory control and data acquisition (SCADA) system that is part of a processing system such as processing system 45 of FIG. 2. In the illustrative embodiment shown, processing system 45 includes a blade server-based computer system 54 that includes several processor blades, at least some of which may provide the above-described SCADA functionality. Other processor blades may be used to implement the disclosed simulation systems and methods. Processing system 45 also includes user workstation 51, which includes a general purpose processor 46. Both the processor blades of blade server 54 and general purpose processor 46 are preferably configured by software, shown in FIG. 2 in the form of removable, non-transitory (i.e., non-volatile) information storage media 52, to process collected well data within the reservoirs and data from a gathering network (described below) that couples to each well and transfers product extracted from the reservoirs. The software may also include downloadable software accessed through a communication network (e.g., via the Internet). General purpose processor 46 couples to a display device 48 and a user-input device 50 to enable a human operator to interact with the system software 52. Alternatively, display device 48 and user-input device 50 may couple to a processing blade within blade server 54 that operates as general purpose processor 46 of user workstation 51.

As noted above, the wells of each reservoir are coupled together by a gathering network. FIG. 3 shows an illustrative example of a group of N reservoirs 302-1 through 302-N coupled together through a gathering network 320. Individual well lines 304 (1 through N) from each well couple to a reservoir node 306 (1 through N), with each node coupling through a reservoir line 305 (1 through N) to a common node 308. Common node 308 provides mixed product from all the reservoirs through riser 309 to processing facility 300. In the example shown, processing facility 300 includes a separator 310 that receives the mixed product from facility riser 309 and separates the product into water, oil and gas. These separated products are respectively stored in water storage 312, oil storage 316 and gas storage 314 for later use and/or delivery further downstream (e.g., to a refining facility). Alternatively, some of the separated product may be used to assist with the removal of product from the reservoir. For example, some of the separated gas and/or water may be re-injected into one or more reservoirs as part of an enhanced oil recovery (EOR) operation, as shown by the dashed arrows in FIG. 3.

The maximization of the production of hydrocarbons from one or more reservoirs feeding a common gathering network involves controlling the production of each individual well such that the combined production of the wells, or a selected group of the wells, provides the greatest amount of oil and/or gas possible without exceeding any of the processing facility's limits or constraints. Such facility constraints may include, but are not limited to, a water production flow rate limit, an oil production flow rate limit, a gas production flow rate limit, a fluid pressure limit, a liquid injection flow rate limit and a gas injection flow rate limit. In at least some illustrative embodiments, the well/reservoir operating settings are determined using a combination of production well measurements, reservoir characterizations and well, reservoir and facility constraints that are all provided as inputs to a simulator. The simulator uses this data to identify optimal operating settings, expressed as a solution to a simultaneous set of equations. In most cases this solution will not be an exact solution, but instead a solution that provides the greatest oil and/or gas production while most closely approaching the facility constraints, but without exceeding any constraints.

Figure 4:
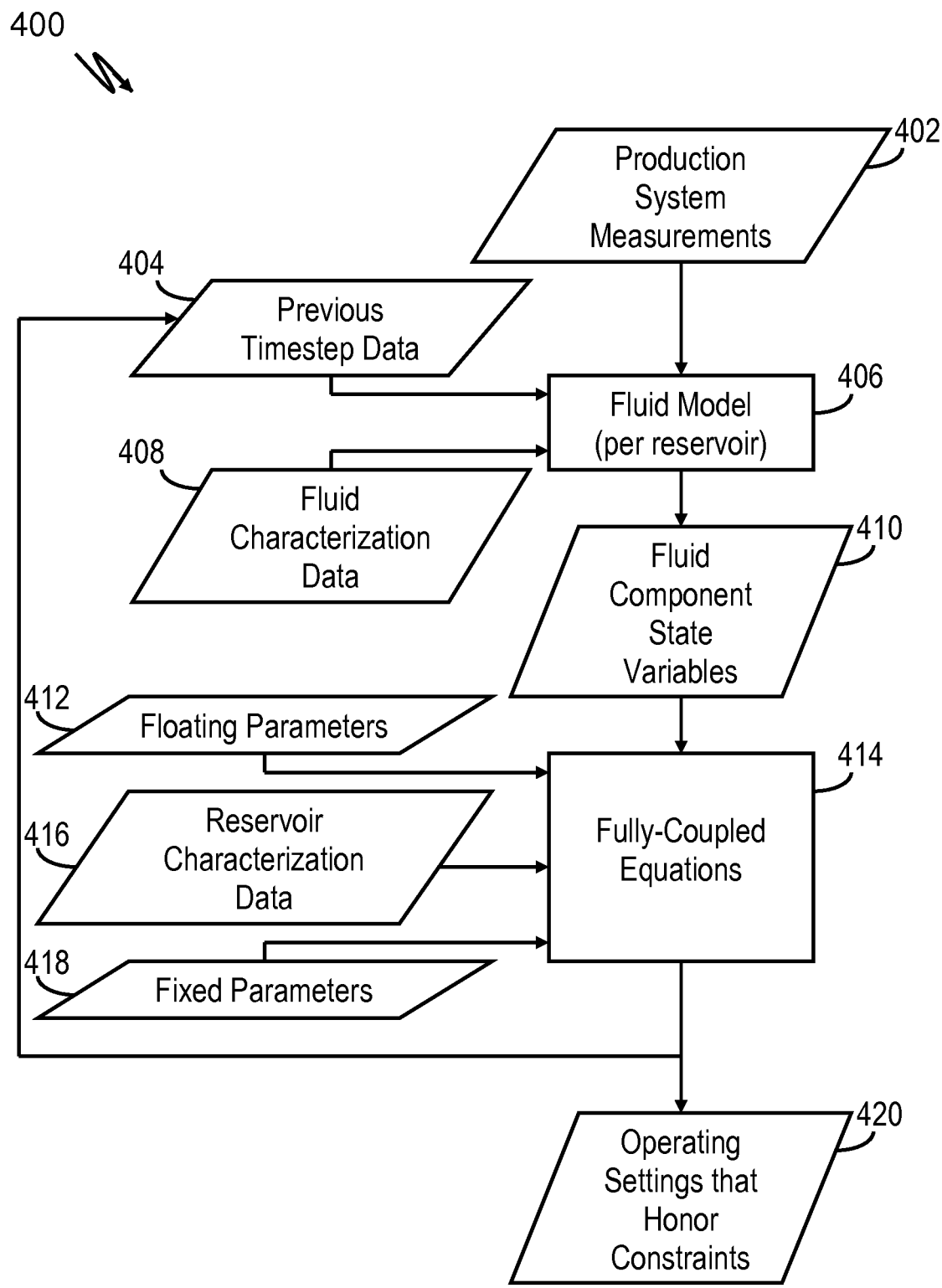
FIG. 4 shows a data flow diagram for an illustrative reservoir simulator.

FIG. 4 shows the data flow for an illustrative simulation 400 that combines available well, reservoir, gathering network and facility data and constraints (i.e., production system data and constraints) to derive the desired production system operating points for a given simulation timestep. A fluid model 406 for each reservoir accepts as inputs production system measurements 402 (both surface and downhole well measurements), simulated reservoir measurements 404 from prior timesteps, and fluid characterization data 408. Production system measurements 402 may include, but are not limited to pressure, temperature and fluid flow measurements taken downhole near the well perforations, along the production string, at the wellhead and within the gathering network. Previous timestep data 404 similarly may represent, without being limited to, updated temperature, pressure and flow data, or other estimates output from fully-coupled equations 414. Fluid characterization data 408 may include the reservoirs' fluid components (e.g., heavy crude, light crude, methane, etc.) and their proportions, fluid density and viscosity for various compositions, pressures and temperatures, or other data.

Based on the above-described data input to the fluid model 406, variables are determined for each fluid component or group of components of the reservoir. The resulting model for each component/group is then applied to known state variables to calculate unknown state variables at each simulation point or "gridblock" within the reservoir, at the wellbore perforations or "sandface," and within the gathering network. These unknown variables may include a gridblock's liquid volume fraction, solution gas-oil ratio and formation volume factor, just to name a few examples. The resulting fluid component state variables 410, both measured and calculated, are provided as inputs to fully-coupled equations 414. As shown, the fully-coupled equations 414 also receive floating parameters 412, fixed parameters 418 and reservoir characterization data 416 as inputs. Examples of floating parameters 412 include EOR parameters such as gas lift injection rates, reservoir gas injection rates and reservoir liquid injection rates. Examples of fixed parameters 418 include facility constraints (e.g., a production capacity limit) and default production rates for individual wells. Reservoir characterization data 416 may include geological data describing reservoir formations (e.g., log data previously collected during drilling and/or prior logging of the well) and formation characteristics (e.g., porosity).

Fully-coupled equations 414 represent the entire production system using a single set of equations that provide a solution to the optimization problem of how to maximize production of the reservoirs over time without exceeding any constraints, including facility constraints. The equations are characterized as "fully-coupled" because all the equations for the reservoir, perforations and network/facility are solved simultaneously, as opposed to loosely-coupled or iteratively-coupled equations, where the reservoir and network/facility equations are solved separately, with the solution of the network/facility equations providing approximate boundary conditions for the reservoir for the next timestep or iteration, and solution of the reservoir equations providing approximate boundary conditions for the network/facility equations. In at least some illustrative embodiments, fully-coupled equations 414 are solved with a Newton method to determine a solution to a set of mass and/or volume balance equations. The equations describe the flow of fluids through the production system and provide a solution that includes operating parameters that honor the various production system constraints (block 420). The equations also provide updated fluid data at the end of the overall simulation time-step (e.g., updated fluid component mass and volume values for each gridblock). At least some of the updated parameters may be provided as previous timestep data 404, as shown in FIG. 4. The simulation process 400 may be repeated for each of a plurality of different timesteps, where various parameter values determined for a given timestep are used to update the simulation for the next timestep.

The flow of fluid can be simulated using mass/volume balance equations representative of the reservoir, of perforations in the wellbore and of the gathering network. The gathering network may include nodes and connections between nodes that are connected to reservoir gridblocks by perforation equations. Nodes may represent physical locations within the gathering network, other relevant gathering components (e.g., separator 310 of FIG. 3) and physical locations within the wells. Connections can represent pipes or devices such as pumps, compressors or valves, to name just a few examples. In at least some illustrative embodiments, the facility equations representing the gathering network include molar balance equations at the nodes, hydraulic equations, constraint equations, and composition equations. The independent variables for the facility equations include pressure and composition for the nodes, and molar flow rates for the connections.

The full system of equations can be expressed in the form, $$\begin{bmatrix} A_{rr} & 0 & A_{rf} \\ 0 & A_{pp} & A_{pf} \\ 0 & A_{fp} & A_{ff} \end{bmatrix} \begin{bmatrix} \delta x_r \\ \delta x_p \\ \delta x_f \end{bmatrix} = - \begin{bmatrix} R_r \\ R_p \\ R_f \end{bmatrix} \quad (1)$$

where R denotes the residuals, and A the Jacobian for a Newton iteration of the production system simulation. A contains the derivatives of the residuals with respect to the variables x, where $x_r$ includes gridblock moles and pressures, $x_p$ includes perforation flow rates, and $x_f$ includes facility and well node compositions and pressures and the total molar flow rate of the facility and well connections. The first row of equations represents the reservoir equations (simulating fluid flow through the reservoir), the second row represents the perforation equations (simulating fluid flow through the perforations to the wells), and the third row represents the facility equations (simulating fluid flow through the gathering network and wells).

With a full set of fully-coupled equations, any of a number of techniques (e.g., a Newton-Raphson method) may be applied to identify a solution set that meets the constraints implicit in said equations while conforming to an acceptable residual range. Such constraints include, but are not limited to, facility constraints (e.g., maximum water cuts for the combined fluid accepted), gathering network constraints (e.g., maximum pressure), and well and reservoir constraints (e.g., maximum flow rates). The solution set describes the updated values for the reservoir, perforation and gathering network (e.g., updated fluid component mass and volume values for each reservoir gridblock), as well as operating settings that honor the constraints included with the equation set. Such operating settings include, but are not limited to, well choke settings, well gas lift injection flow rates, reservoir gas injection and/or production rates and reservoir liquid injection and/or production flow rates. Many other operating settings that can be included within the solution set will become apparent to those of ordinary skill in the art, and all such settings are within the scope of the present disclosure.

In at least some illustrative embodiments, the facility equations include equations that describe one or more relationships between target parameters and processing facility constraints. Target parameters may include, but are not limited to, water production flow rates, oil production flow rates, gas production flow rates, liquid injection flow rates and gas injection flow rates. Combinations of target parameters for wells feeding a common gathering network are identified so as to maximize the overall production fed through the gathering network and into the processing facility, but without exceeding the processing facility's limits or constraints. It should be noted that although the discussion and examples are described in the context of the production of fluids from wells, these are also applicable to the injection of liquids or gases into the wells and/or a combination of production and injection, each with respect to different wells.

In at least some illustrative embodiments target parameter combinations are identified by first ranking wells from one or more reservoirs based on a common parameter (e.g., oil/water ratio). The combined production (e.g., oil production) of all of the wells is calculated based on each well being simulated at its maximum flow rate, and at these production levels one or more facility constraints will generally be exceeded. Wells with the least favorable parameter values (e.g., wells with a low oil/water ratio) are sequentially removed from the combined production calculation (i.e., simulated as shut-in), from least favorable towards most favorable, until at least one previously violated facility constraint is no longer violated. The wells that remain in the combined production calculation are designated as non-swing wells for the constraint that is no longer violated.

In at least some illustrative embodiments, the last well removed from the calculation is designated as a swing well, while in other embodiments more than one of the last wells removed (e.g., the last three) are designated as swing wells. Each swing well is simulated as being operated at less than its maximum/optimal production level so that that the facility constraint is as close to being satisfied as is possible or practical without being violated. The production level identified for the swing well is the target parameter. This process is repeated for each violated facility constraint until none of the constraints are violated. As each additional facility constraint is processed, the wells designated as swing and non-swing wells for previously processed facility constraints may need to be adjusted in order to keep production at or close to the limit for those facility constraints. The result is a set of equations for each constraint, wherein a well may be a swing well with respect to one constraint, but a non-swing or shut-in well with respect to other constraints.

The relationship between target parameters, the non-swing wells and the facility limits can be describe described by the equation, $$Q_{wtk} = Q_{fk} - \Sum_{i=1}^{N} Q_{wki} \quad (2)$$

where $Q_{wtk}$ is the $k^{th}$ target parameter, $Q_{fk}$ is the facility constraint corresponding to the $k^{th}$ target parameter, and $Q_{wki}$ is the maximum/optimal production level for well i of the N non-swing wells corresponding to the $k^{th}$ target parameter. For example, if water rates are used, the target water rate is the difference between the processing facility water constraint and the sum of the water rates of the non-swing wells at maximum/optimal production levels. It should be noted that while in at least some illustrative embodiments a given target parameter is applied to a single swing well, in other embodiments the target parameter is apportioned between two or more swing wells. This apportionment may be expressed as, $$Q_{wkj} = f_{kj} * Q_{wtk} \quad (3)$$

where $f_{kj}$ is the fraction of the $k^{th}$ target parameter for swing well j and, $$\Sum_{j=1}^{M} f_{kj} = 1 \quad (4)$$

for M swing wells.

It should also be noted that the facility constraint $Q_{fk}$ can be a function of the production or injection of other wells. For example, the gas injection rate for the facility may be determined by the amount of gas produced from a reservoir. Further, in at least some illustrative embodiments the $f_{kj}$ factors are defined by the user. Using the water rate example, a user may shut in high water cut wells while scaling back (rather than shutting in) one or more swing wells to satisfy the processing facility's water rate constraint. In other illustrative embodiments, each swing well is identified by a constrained optimization of a benefit function, wherein swing wells are heuristically assigned to each facility constraint. For example, high gas/oil ratio wells may be assigned as swing wells for gas rate processing facility constraints.

The above-described equations may be incorporated as part of the set of fully-coupled equations (1). The inclusion of the swing/non-swing well equations enables the solution set of the fully-coupled equations to provide settings for operating the wells and gathering network such that all of the various facility constraints are honored. Further, the use of swing wells enables operators to make adjustments to the operating settings that ensure that the facility constraints continue to be honored, without the need to perform additional costly simulation iterations.

Figure 5:
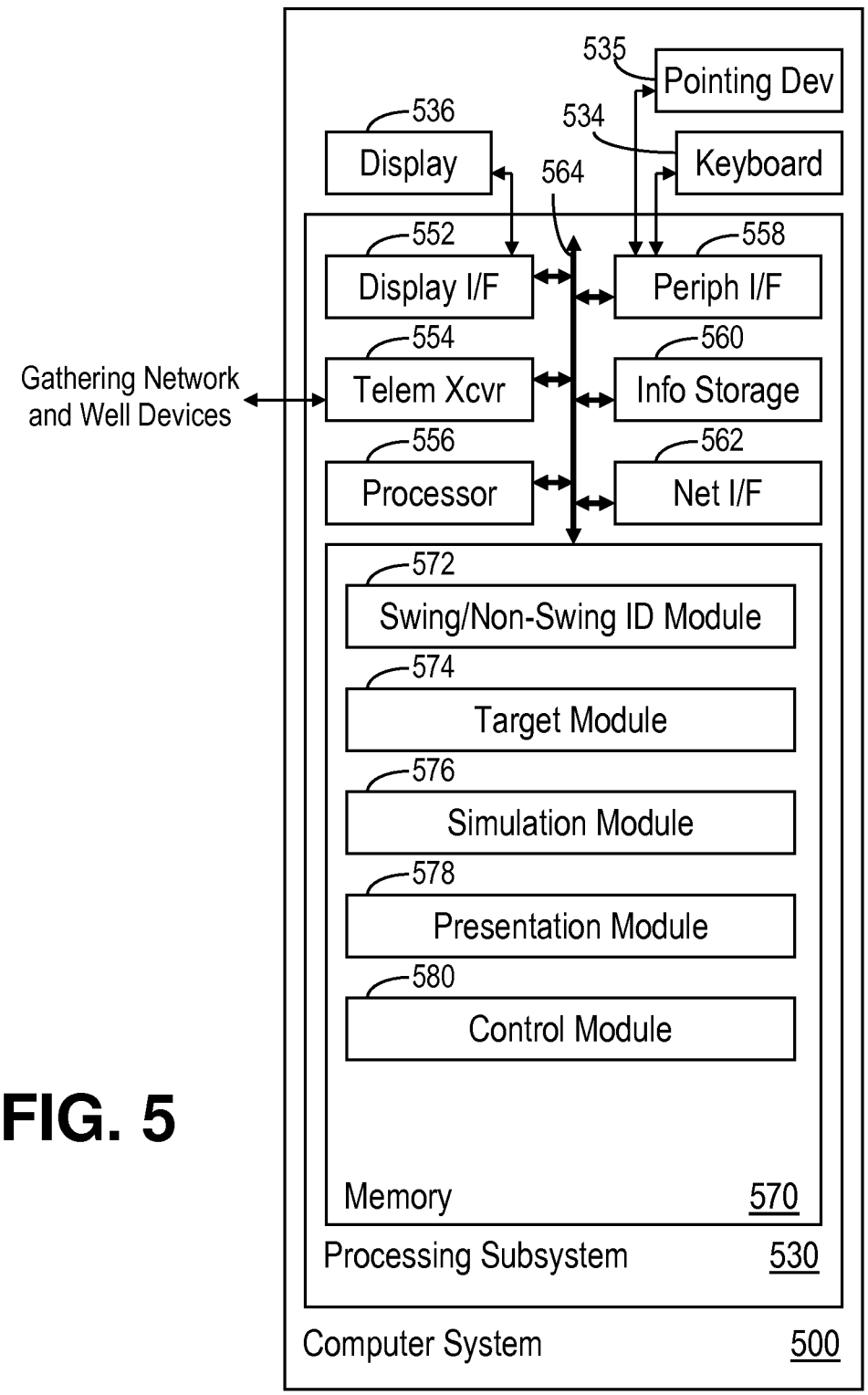
FIG. 5 shows a block diagram of a computer system suitable for implementing the disclosed methods and systems.

In at least some illustrative embodiments, the above-described production system simulation is implemented in software that executes on a computer system such as computer system 500 of FIG. 5. Both hardware and software components of computer system 500 are shown, which in at least some illustrative embodiments implement at least part of the production system simulation shown as method 600 in FIG. 6 (described in more detail below). A user may interact with computer system 500 via keyboard 534, pointing device 535 (e.g., a mouse) and display 536 to configure, control and monitor the execution of the production system simulation.

Located within processing subsystem 530 of computer system 500 is a display interface 552, a telemetry transceiver 554, a processor 556, a peripheral interface 558, an information storage device 560, a network interface 562 and a memory 570. Bus 564 couples each of these elements to each other and transports their communications. Telemetry transceiver 554 enables processing subsystem 530 to communicate with gathering network and well/reservoir devices (e.g., via wired and/or wireless communication links), and network interface 562 enables communications with other systems (e.g., via the Internet with a central database server housing historical data). In accordance with user input received via peripheral interface 558 and program instructions from memory 570 and/or information storage device 560, processor 556 processes information received via telemetry transceiver 554 to provide well and gathering network measurements to the production system simulation in accordance with the disclosed methods, and further operates to execute the simulation and present the simulation results to the user.

Figure 6:
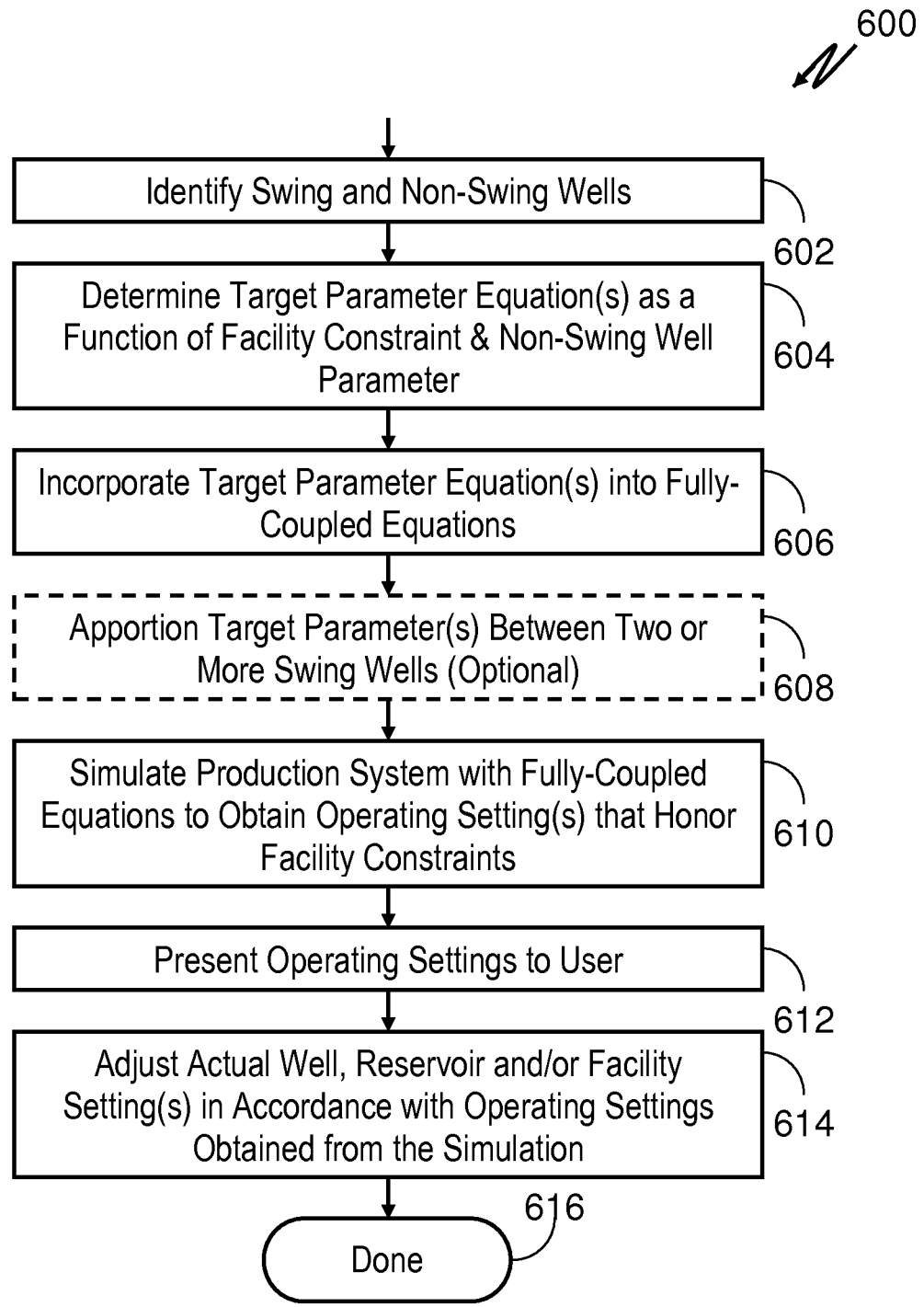
FIG. 6 shows a flowchart describing an illustrative example of the disclosed methods.

FIG. 6 shows an illustrative method 600, at least part of which may be implemented by software executing on computer system 500. It should be noted that although the embodiment shown in FIG. 5 shows the various software modules executing on computer system 500, in other illustrative embodiments some or all of the modules may execute on two or more computers within a networked and/or distributed system. Referring now to both FIGS. 5 and 6, swing and non-swing wells are identified as previously described (block 602; swing/non-swing ID module 572). One or more target parameter equations are determined that each correspond to a facility constraint and are each a function of said facility constraint and of one or more non-swing well parameters (block 604; target module 574). The target parameter equations are incorporated into a fully-coupled set of equations (block 606; simulation module 576) that represents the entire production system. In at least some illustrative embodiments the target parameter equation(s) optionally include(s) an apportionment of a target parameter between two or more wells (block 608; target module 574).

The equation set is used to simulate the production system, obtaining a solution set that includes operating settings for various elements of the production system that honor the processing facility constraints (block 610; simulation module 576). The operating settings include settings of field control devices that determine the production and/or injection of fluids from/into the wells and the reservoirs. The operating settings are presented to a user (block 612; presentation module 578), and in at least some illustrative embodiments may be used to manually adjust well, reservoir, gathering network and/or facility settings (block 614), ending the method (block 616). In other illustrative embodiments, at least some of the operating settings are transmitted to field equipment by computer system 500 via telemetry transceiver 554 to automatically adjust well, reservoir, gathering network and/or facility system devices (block 614; control module 580).

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method for determining operating settings for a fluid production system comprising a plurality of wells and a processing facility, the method comprising:
    ranking the plurality of wells based on a common parameter;
    sequentially removing wells with a least favorable common parameter from a combined production calculation for the plurality of wells in the fluid production system where at least one processing facility constraint is violated until the at least one processing facility constraint is no longer violated, wherein any wells that remain in the combined production calculation are designated as one or more non-swing wells for the processing facility constraint and at least one last well removed from the combined production calculation is designated as at least one swing well;
    determining at least one target parameter equation that is a function of the at least one processing facility constraint and of one or more non-swing well parameters;
    incorporating the at least one target parameter equation into a fully-coupled equation set representing the fluid production system;
    simulating the fluid production system using the fully-coupled equation set to obtain one or more operating settings for the at least one swing well, such that the at least one processing facility constraint is not exceeded, wherein equations for reservoirs, perforations, and the processing facility of the fully-coupled equation set are solved simultaneously; and
    presenting to a user the one or more operating settings for the at least one swing well, wherein the user adjusts actual settings for the at least one swing well in accordance with the operating settings for the at least one swing well obtained from the simulation.

2. The method of claim 1, further comprising operating the one or more non-swing wells at their maximum or optimal production or injection rates, and operating the at least one swing well at a setting other than its full or optimal production or injection rate.

3. The method of claim 1, further comprising updating the one or more operating settings of the at least one swing well in response to changes in production or injection rates of the one or more non-swing wells, wherein updating the operating settings prevents violating the at least one processing facility constraint.

4. The method of claim 3, further comprising repeating the ranking, sequentially removing, determining, incorporating, simulating and presenting if the updating fails to prevent violating the at least one processing facility constraint.

5. The method of claim 1, wherein the one or more operating settings comprise a well choke setting, a well gas lift injection flow rate, a reservoir gas injection flow rate, a reservoir gas production flow rate, a reservoir liquid injection flow rate or a reservoir liquid production flow rate.

6. The method of claim 1, wherein the fully-coupled equation set includes a volume balance equation or a mass balance equation.

7. The method of claim 1, wherein the at least one target parameter comprises a water flow rate, an oil production flow rate, a gas production flow rate, a liquid injection flow rate or a gas injection flow rate.

8. The method of claim 1, wherein the at least one processing facility constraint comprises a water production flow rate limit, an oil production flow rate limit, a gas production flow rate limit, a fluid pressure limit, a liquid injection flow rate limit or a gas injection flow rate limit.

9. The method of claim 1, further comprising apportioning the at least one target parameter to at least two swing wells, wherein incorporating the at least one target parameter comprises incorporating apportioned target parameters.

10. The method of claim 1, wherein at least one of the plurality of wells is shut in.

11. A system for determining fluid production operating settings for a fluid production system comprising a plurality of wells and a processing facility, the system comprising:
    a memory having modeling and simulation software; and
    one or more processors coupled to the memory, the software causing the one or more processors to:
        rank the plurality of wells based on a common parameter;
        sequentially remove wells with a least favorable common parameter from a combined production calculation for the plurality of wells in the fluid production system where at least one processing facility constraint is violated until the at least one processing facility constraint is no longer violated, wherein wells that remain in the combined production calculation are designated as non-swing wells for the processing facility constraint and at least one last well removed from the combined production calculation is designated as at least one swing well;
        determine at least one target parameter equation that is a function of one or more non-swing well parameters and of the at least one processing facility constraint;
        incorporate the at least one target parameter equation into a fully-coupled equation set representing the fluid production system;
        simulate the fluid production system using the fully-coupled equation set to obtain one or more operating settings for the at least one swing well, such that the at least one processing facility constraint is not exceeded, wherein equations for reservoirs, perforations, and the processing facility of the fully-coupled equation set are solved simultaneously; and
        present to a user the one or more operating settings for the at least one swing well, wherein the user adjusts actual settings for the at least one swing well in accordance with the operating settings for the at least one swing well obtained from the simulation.

12. The system of claim 11, wherein the software further causes the one or more processors to operate the one or more non-swing wells at their maximum or optimal production or injection rates, and to operate the at least one swing well at a setting other than its full or optimal production or injection rate.

13. The system of claim 11, wherein the software further causes the one or more processors to update the one or more operating settings of the at least one swing well in response to changes in production or injection rates of the one or more non-swing wells, wherein the update to the operating settings prevents a violation of the at least one processing facility constraint.

14. The system of claim 13, wherein the software further causes the one or more processors to repeat the well ranking, the sequential well removal the target parameter equation calculation and incorporation, the production system simulation and the operating settings presentation if the operating settings update fails to prevent the violation of the at least one processing facility constraint.

15. The system of claim 11, wherein the one or more operating settings comprise a well choke setting, a well gas lift injection flow rate, a reservoir gas injection flow rate, a reservoir gas production flow rate, a reservoir liquid injection flow rate or a reservoir liquid production flow rate.

16. The system of claim 11, wherein the fully-coupled equation set includes a volume balance equation or a mass balance equation.

17. The system of claim 11, wherein the at least one target parameter comprises a water production flow rate, an oil production flow rate, a gas production flow rate, a liquid injection flow rate or a gas injection flow rate.

18. The system of claim 11, wherein the at least one processing facility constraint comprises a water production flow rate limit, an oil production flow rate limit, a gas production flow rate limit, a fluid pressure limit, a liquid injection flow rate limit or a gas injection flow rate limit.

19. The system of claim 11, wherein the software further causes the one or more processors to apportion the at least one target parameter to at least two swing wells, wherein the processor incorporates the at least one target parameter by incorporating apportioned target parameters.

20. The system of claim 11, wherein at least one of the plurality of wells is shut in.

* * * * *